Figure 1:
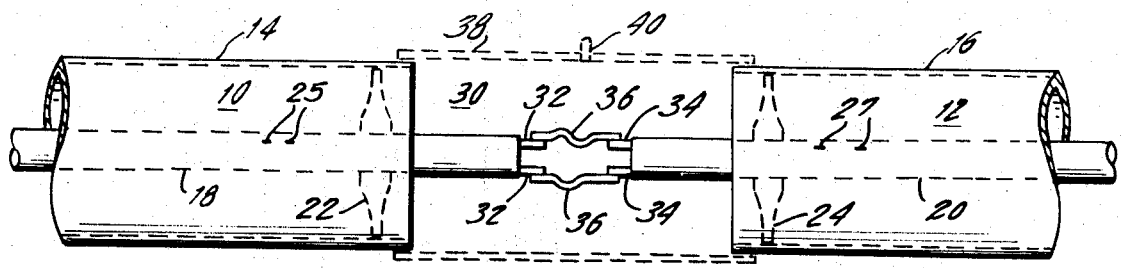

United States Patent

[11] 3,558,798

| [72] | Inventor | Roy H. Albright<br>Greensburg, Pa. |
|---|---|---|
| [21] | Appl. No. | 828,588 |
| [22] | Filed | May 28, 1969 |
| [45] | Patented | Jan. 26, 1971 |
| [73] | Assignee | I-T-E Imperial Corporation<br>Philadelphia, Pa.<br>a corporation of Delaware |

[54] INTERNAL CHECK VALVE FOR GAS INSULATED TRANSMISSION SYSTEM
7 Claims, 2 Drawing Figs.

[52] U.S. Cl. .................................................. 174/10,
174/11, 174/22, 174/28
[51] Int. Cl. ..................................................... H02g 5/06
[50] Field of Search ........................................... 174/8, 10,
11, 14, 16B, 21.3, 22, 22.2, 23, 24, 28

[56] References Cited
UNITED STATES PATENTS

| 2,015,542 | 9/1935 | Zeiss ............................ | 174/22 |
| 2,049,835 | 8/1936 | Emanuelli ..................... | 174/10 |
| 3,348,001 | 10/1967 | Upton, Jr. et al. ............. | 200/48 |

FOREIGN PATENTS

| 1,123,237 | 8/1968 | Great Britain ................ | 174/22 |

*Primary Examiner*—Laramie E. Askin
*Attorney*—Ostrolenk, Faber, Gerb & Soffen

ABSTRACT: An internal check valve for gas-insulated transmission systems which permits retention of the high dielectric gas in individual bus-section units during shipment and during the joining of adjacent sections to form an installation. The check valve is internal to the bus section, and is operable upon gas filling a joining splice section to remove the gas retention seal and allow for the relatively free passage of gas between adjoining bus sections until the gas pressures therein are equalized.

PATENTED JAN 26 1971

3,558,798

INVENTOR.
ROY H. ALBRIGHT
BY
OSTROLENK, FABER, GERB & SOFFEN
ATTORNEYS

INTERNAL CHECK VALVE FOR GAS INSULATED TRANSMISSION SYSTEM

This invention relates to compressed-gas insulated electrical conductors and, more particularly, to a check valve for inclusion therein to permit gas retention during shipment of individual conductor units and during the installation thereof, and to remove the gas-retaining seal when installation is completed and operation of the transmission system is ready.

Compressed-gas-insulated conductors are normally comprised of metal-enclosed high-voltage electrical conductors in which a metallic conductor, generally tubular, is centrally supported within a grounded metal tube of larger diameter by means of a solid disc or cone-shaped insulator. The metallic conductor is insulated from the enclosure tube by means of a compressed-gas such as sulfurhexafluoride ($SF_6$) having a high dielectric characteristic. Such electrical conductors may be used as buses in electrical sub stations, or generating stations, or for transmission of electrical power over either short, intermediate or long distances. These metal-enclosed high-voltage electrical conductors may be buried underground or supported at some convenient height above ground.

The principal advantage of Compressed-gas-insulated buses in a transmission system, as compared with conventional open buses, is a tremendous reduction in the space requirements which such multiphase bus systems occupy. Whereas extra-high-voltage (EHV) buses of open construction in air normally require ground clearances of 8 to 15 feet and phase spacings of 15 to 25 feet, buses of the metal-enclosed compressed-gas type can be provided with ground clearances of as little as 4 to 10 inches and phase spacings of as little as 24 to 42 inches for the same voltage ratings. In addition thereto, the compressed-gas-insulated bus having a grounded metal enclosure for each phase offers greater reliability and safety, as compared with conventional, open EHV conductors.

Along with the increasing interest in gas-insulated transmission systems, there is an increasing recognition of the problem associated with retaining the high dielectric gas in the individual bus sections until the system is ready for operation. One such problem involves the prevention of gas leakage during shipment. Another problem involves the installation of individual bus sections in a manner as to permit relatively free passage of the high dielectric gas from one section to the next after the joinings thereof by the housing splice employed. As will become clear hereinafter, these problems can be solved by employing a check valve at either end of a bus-section unit of a construction to seal the gas in each section and to be disrupted to permit gas glow after the installation has been completed.

U.S. Pat. Nos. 3,331,911, 3,348,001 and 3,356,798 all disclose in one form or another an arrangement which permits sealing of a bus section unit intended for use in a gas-insulated transmission system of the type herein described. The construction employed in each of those patents, however, is for the purpose of sealing off sectors of the transmission system in order to repair the remainder of the system without any loss of the insulating gas. After the maintenance or repair has been completed, a network of external pipes and valves are used to enable the insulating gas to once again flow between the bus-section sectors comprising the transmission system. Although being concerned with permitting components of the transmission system to be taken out of service without affecting the operation of the remaining components, it will be seen that these prior art patents generally disclose, in broad terms, the need for preventing leakage of gas within an individual bus-section unit. And, although describing a valve and pipe arrangement which is external to the bus sections themselves, these references disclose the need for reestablishing gas flow between individual adjacent units.

The present invention, first of all, is directed not towards solving a maintenance or repair problem in the gas-insulated transmission system but is concerned with the construction of the installation to begin with. Secondly, the instant invention is directed towards the inclusion of an internal valve to allow relatively free gas passage rather than to an external network of pipes and valves to reestablish the communication after any maintenance or repair has been completed.

As will be subsequently seen from the following description, the present invention describes an internal check valve employing a pressure-responsive plunger as its primary operative element. The plunger is so positioned within the bus section that the high dielectric gas included within the bus at a pressure in excess of atmospheric pressure acts in a direction to maintain the seal when the section is shipped or stored, or in any manner prior to its installation. The plunger is further oriented so that when adjacent chambers are connected through a splice-housing joint, the subsequent evacuation of air in that chamber and injection of gas at higher pressures exerts a force in a direction to disturb and release the plunger. This same operation is duplicated at the confronting end of the adjacent bus section with the total result being that relatively free gas flow results between the two sectors and the splice housing.

It is an object of the present invention, therefore, to provide a check valve for gas-insulated transmission systems to permit simple installation of individual bus-section units.

It is another object of the invention to provide such a check valve which acts to retain the high dielectric insulating gas in the section until a time at which the transmission system is ready to begin operation.

It is a further object of the invention to provide such a check valve which is internal to the individual bus-section units so as to allow relatively free gas communication between adjacent units.

Figure 2:
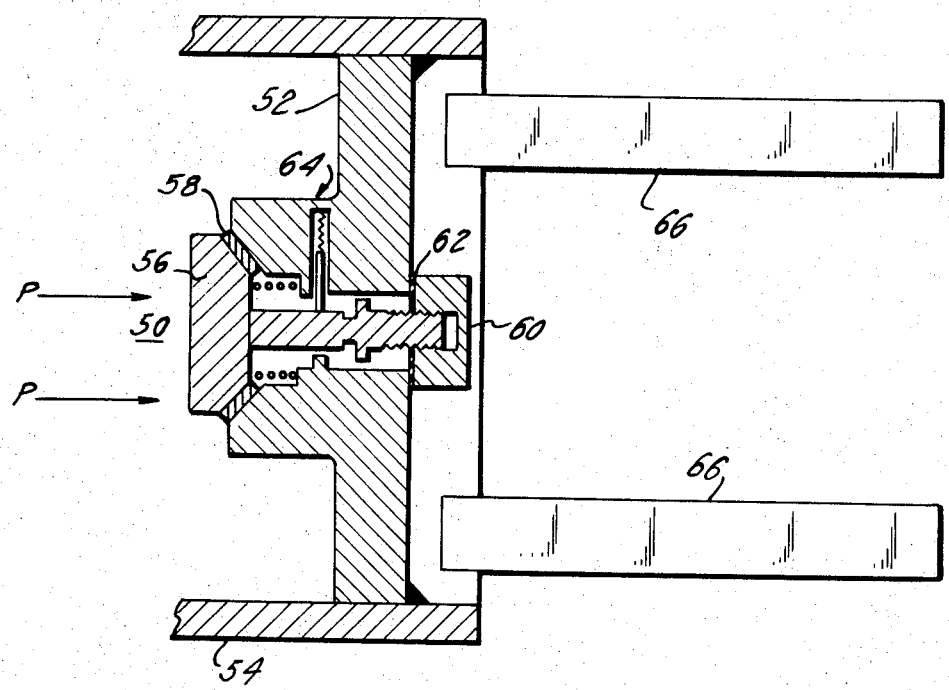

These and other objects of the present invention will be more fully understood from a consideration of the following description taken in conjunction with the accompanying drawings in which:

FIG. 1 is a schematic illustration of the manner in which adjacent bus-section units are joined in a gas-insulated transmission system environment; and FIG. 2 is a schematic illustration, partially in section view, of a check valve embodying the invention as it would be positioned at one end of a bus-section structure.

DESCRIPTION AND OPERATION OF THE INSTALLATION STRUCTURE OF THE GAS-INSULATED TRANSMISSION SYSTEM OF FIG. 1

In FIG. 1, reference numerals 10 and 12 represent two adjacent bus-section units to be installed in a gas-insulated transmission system. The lengths of the sections are not a critical feature in the system, but are generally selected as a balance between handling and field installation, and in accordance with the restrictions and regulations of the carrier having the responsibility of shipping the units to the place where installation is to be completed. Typical lengths, for example, may be of the order of 10 to 50 feet, with the opposite ends of the sections being of similar construction as described below.

Each of the sections 10 and 12 comprises a metal pipe 14, 16, which is generally tubular or cylindrical in shape. The pipes 14, 16 contain and surround a hollow tubular or cylindrical conductor 18, 20 which is supported inside the pipe by insulator spacers 22, 24 (only one of which is shown for each pipe for simplicity), disposed along the conductor 18, 20 in coaxial alignment. The insulator 22, 24 are preferably of a disc type, with each insulator having a greater cross section near the conductor than it has near the pipe in order to make the voltage gradient more nearly uniform between the conductor and the pipe. Since the voltage gradients are higher at the conductor 18, 20 and lower at the grounded pipe 14, 16, the tapered disc insulator 22, 24 makes the voltage gradient more uniform between the conductor and the pipe.

These insulating discs 22, 24 have a central opening for receiving and positioning the conductor 18, 20 and an outer periphery generally conforming to the interior contour of the pipes 14, 16. The central opening of these discs 22, 24 also conforms to the contour of the conductor and thus serves to prevent leakage of the insulating gases around the conductors 18, 20 and between the insulators 22, 24 and the pipe enclosure 14, 16. As shipped, each section 10, 12 is pressurized with insulating gas—sulfurhexafluoride ($SF_6$). It will be appreciated that this gas has high insulating, high dielectric characteristics. A plurality of small openings 25, 27 are arranged at spaced intervals around the conductors 18, 20 to allow for the entrance of the compressed gas into the hollow region between the opposing faces of the conductor and the surrounding pipe enclosure 14, 16.

The illustration of FIG. 1 also shows a splice housing section 30 for joining the conductors 18 and 20 for covering the connection so made. In particular, tangs 32 of conductor 18 are shown as being connected to tangs 34 of conductor 20 by means of connecting links 36 within the housing 30. After the electrical connection is completed between the conductors 18 and 20, a hollow, metallic, slidable dust cover 38 is installed and welded, or similarly sealed in place. As will be understood, this cover 38 is installed after the splice connection has been completed in the field.

At this point, the space within the cover-splice volume contains air at atmospheric pressure. In order to use the FIG. 1 assembly as part of the gas-insulated transmission system, it becomes necessary to inject insulating gas into this splice-housing volume so as to also provide it with a high dielectric medium. Therefore, a port 40 is also shown in FIG. 1 within the splice-housing 30, through which the air is first pumped out of the volume and through which the insulating gas is then injected.

Upon completing the pressurizing of this intermediate section, the next step is to permit the free flow of gas from the bus-section 10 to the bus section 12. One way of doing this is to provide an external pipe and valve arrangement through which the insulating gas can flow to equalize the pressure within the adjacent sections 10 and 12. Such an arrangement might be one as described in the prior-art patents referred to above, though noting that those arrangements were described in a context of separating adjacent sections for purposes of maintenance and repair. However, as will become clear from the following description, a check valve embodying principles of the present invention provides a more economical and simpler approach to permitting the gas flow and equalizing the pressures.

DESCRIPTION AND OPERATION OF THE CHECK VALVE OF FIG. 2

In FIG. 2, the check valve 50 is shown as having a sealed diaphragm 52 attached by any suitable means (welded, for example) to the opposing faces of the conductor 54 to provide a sealed joint therewith. The sealing of the high dielectric gas for shipment is achieved by means of a plunger 56 and a gasket 58 positioned against the head end thereof. As indicated in the drawing, the plunger 56 is oriented in a manner as to be forced by the presence of pressurized gas in a direction to buttress the seal (to the right). Thus, when undergoing shipment, this gas in excess of atmospheric pressure operates in a direction to maintain the seal. To overcome any possibility that the plunger 56 could be jarred during shipment—and thereby permit a flow of gas to reduce its effectiveness—a nut 60 and a second gasket 62 are included to hold the plunger 56 in place until the bus section is installed. Just before the conductor splice connections are made in the field, the nut 60 and gasket 62 are removed, and the internal pressure alone holds the plunger 56 in place to maintain the seal.

A small, spring-biased plunger 64 may also be used to hold the plunger 56 after it has been moved (in a manner to be described), in order to provide the desired opening for communication of gases. The reference numerals 66 in FIG. 2 represent the tangs to be electrically connected to similar such elements of the adjacent bus-section conductor.

The operation of the check valve of FIG. 2 is as follows. After the splice housing 30 of FIG. 1 has been installed and sealed, the volume enclosed thereby is evacuated of air. This results in there being a greater pressure in the bus section 50 than exists in the evacuated splice unit 30, which differential serves to force the plunger 56 from left to right in the drawing to maintain the seal. Insulating gas, such as the sulfurhexafluoride gas, is then injected into the splice housing 30 through the port 40 until the pressure in the housing equals that of the pressures within the adjacent bus enclosures, 10 and 12 in FIG. 1. Further increase of this pressure thus cause the plunger 56 to release (i.e., move from right to left in FIG. 2), enabling the gas to flow between the bus section 10 through the housing 30 to the adjacent section 12. (In this respect, it will be appreciated that the orientation of the plunger assembly in the check valve of FIG. 2 will be reversed for inclusion in the bus section 12 which mates with the bus section 10 of FIG. 2.)

It will also be seen that the spring-biased plunger 64 in FIG. 2 can be used to hold the plunger 56 after it has been moved to regulate the amount of the opening. Thus, the position and spring force of the plunger 64 can be selected to match the free flow conditions from one bus section to the next. The end result in this arrangement is that the gas pressure in the various sections of the gas-insulated transmission system will be equalized. If this were not so, and the pressures were unequal, the system would not be used to its most effectiveness as one of the bus sections would be less effective in handling operating power than could be handled by the other sections of the system. Equalizing pressures, therefore, provide the optimum operating condition for the gas-insulated system.

While there has been described what is considered to be a preferred embodiment of the check valve of the present invention, it will be appreciated that other internal valve arrangements may be utilized without departing from the scope and spirit of the invention. As will be seen herein, the present invention employs a check valve which is internal to the various sections of the gas-insulated transmission system. This check valve is oriented in a manner so as to prevent leakage from around the conductors during shipment and storage of the individual bus sections and is arranged in a simple manner to facilitate communication of gas between various sections of the transmission chain. Other check valves can similarly be employed internal to the bus-section assembly to serve the purpose hereinabove described. As will be apparent, the internal structure provided is far simpler to construct and operate than are the arrangements which one might alternatively employ to use external pipe and valve systems to control gas fluid flow.

I claim:
1. A compressed-gas-filled bus section comprising:
   an elongated tubular conductor having an opening for the flow of gas therethrough;
   an elongated tubular conductive enclosure coaxially aligned with and surrounding said conductor;
   a pair of insulating spacers being positioned near the ends of said section, with each spacer having a central portion receiving and positioning said conductor and with each spacer having an outer periphery generally conforming to the interior contour of said enclosure and an inner periphery of said portion generally conforming to the outer contour of said conductor;
   means mechanically securing both of said spacers to said enclosure to support said conductor and to prevent leakage of gas within said section around said conductor and between said spacers and said enclosure;
   valve means internal to said conductor sealing the opening thereof in response to the pressure of compressed gas present in said bus section on an inwardly facing side of said valve means in excess of gas pressure on an outwardly facing side to prevent the flow of compressed gas from said section through said conductor opening and unsealing the opening thereof in response to gas pressure on said outwardly facing side of said valve means in excess of said compressedygas pressure on said inwardly facing side to permit the flow of compressed gas from said section through said conductor opening; and wherein said valve means includes a diaphragm secured to and generally conforming to the interior contour of said tubular conductor providing a sealed joint therewith and a plunger assembly for closing and unclosing said conductor opening in response to differences between said internal compressed-gas pressure, on said inwardly facing side of said valve means and the gas pressure on said outwardly facing side.

2. The section of claim 1 wherein there is additionally included a first gasket positioned between said diaphragm and the head end of said plunger assembly for further sealing said section to prevent the flow of gas therefrom.

3. The section of claim 2 wherein there is additionally included a second gasket and locking means coaxially aligned with said plunger assembly to hold said plunger assembly in place prior to installation of said gas-filled bus section.

4. The section as defined in claim 2 wherein there is additionally provided a biased spring plunger assembly for controlling the amount of unclosing of said conductor opening in response to a gas-pressure differential on said first plunger assembly operating in a direction to remove the seal provided thereby.

5. Apparatus for joining a pair of gas-filled bus sections of the type described in claim 2, which sections are arranged in end-to-end fashion, comprising:
   a hollow, metallic, slidable dust cover telescoped to the confronting ends of the sections being joined;
   means for respectively securing the ends of said sections to said cover; and
   said cover having a port by which air present in the volume described by said cover and by said section ends is removed from said volume and by which gas is injected under pressure greater than that of the gas filling said bus sections, to force the unclosing of said conductor opening to permit gas flow between said first and second sections.

6. The apparatus of claim 5 wherein there is further included a pair of elongated conductive links having their ends connected to the confronting ends of the conductors provided in the bus sections being joined.

7. The section of claim 1 wherein said gas is sulfurhexafluoride.